(12) United States Patent
Bonse et al.

(10) Patent No.: US 8,375,580 B2
(45) Date of Patent: Feb. 19, 2013

(54) METHOD FOR MANUFACTURING CAMS FOR COMPOSITE CAMSHAFTS

(75) Inventors: Rudolf Bonse, Attendorn (DE); Jürgen Schellbach, Thale (DE); Jochen Wolf, Quedlinburg (DE)

(73) Assignee: Muhr und Bender KG, Attendorn (DE)

( * ) Notice: Subject to any disclaimer, the term of this patent is extended or adjusted under 35 U.S.C. 154(b) by 919 days.

(21) Appl. No.: 12/156,801

(22) Filed: Jun. 5, 2008

(65) Prior Publication Data
US 2008/0301938 A1 Dec. 11, 2008

(30) Foreign Application Priority Data
Jun. 6, 2007 (DE) .................. 10 2007 026 824

(51) Int. Cl.
*B21D 39/00* (2006.01)
*B21D 53/84* (2006.01)
*F01L 1/04* (2006.01)

(52) U.S. Cl. .......... 29/888.1; 29/447; 29/521; 29/522.1; 74/567; 123/90.6

(58) Field of Classification Search ............. 29/888.1, 29/447, 505, 521, 522.1, 523; 74/567; 123/90.6
See application file for complete search history.

(56) References Cited

U.S. PATENT DOCUMENTS

| | | | | |
|---|---|---|---|---|
| 4,317,355 A | * | 3/1982 | Hatsuno et al. | 72/342.94 |
| 4,616,389 A | * | 10/1986 | Slee | 419/8 |
| 4,882,825 A | * | 11/1989 | Nakamura | 29/888.1 |
| 4,993,282 A | | 2/1991 | Swars | |
| 5,829,131 A | * | 11/1998 | DeSloover et al. | 29/888.1 |
| 6,473,964 B1 | * | 11/2002 | Anderson et al. | 29/888.1 |
| 7,020,962 B2 | * | 4/2006 | Merz | 29/888.1 |
| 2001/0025416 A1 | * | 10/2001 | Gueydan | 29/888.1 |
| 2005/0102834 A1 | * | 5/2005 | Wiesner et al. | 29/888.1 |
| 2008/0276888 A1 | * | 11/2008 | Muster | 123/90.6 |

FOREIGN PATENT DOCUMENTS

| | | |
|---|---|---|
| DE | 4446076 C1 | 1/1996 |
| DE | 10134776 A | 2/2002 |
| DE | 10101934 A1 | 8/2002 |

(Continued)

OTHER PUBLICATIONS

European Search Report, Application No. 08010231.2 dated Oct. 14, 2008.

(Continued)

*Primary Examiner* — Alexander P Taousakis
(74) *Attorney, Agent, or Firm* — MacMillan, Sobanski & Todd, LLC (57) ABSTRACT

A method for manufacturing cams for composite camshafts with the steps
hot-forming a cam 11 such that a cam outside contour is produced and a cam bore 13 is punched and
axially and radially calibrating the cam 11, wherein the calibration comprises the steps
inserting the cam into an undivided mold 21 that defines the calibrated cam outside contour 12,
inserting an arbor 23 into the cam bore 13 that defines the calibrated cam bore 13, and
axially shortening the cam 11 between a lower die 22 that is situated between the mold 21 and the arbor 23 and on which the cam 11 lies with a first end face 14 and an upper die 25 that is guided between the mold 21 and the arbor 23 and acts upon the second end face 15 of the cam 11.

14 Claims, 5 Drawing Sheets

| | FOREIGN PATENT DOCUMENTS | | |
|---|---|---|---|
| DE | 10329410 A1 | 1/2005 | |
| DE | 102004049272 A1 | 4/2006 | |
| DE | 102006006029 B3 | 6/2007 | |
| EP | 0718473 A1 | 6/1996 | |
| EP | 1347211 A1 | 9/2003 | |
| EP | 1107839 B1 | 9/2004 | |
| WO | 9627460 A1 | 9/1996 | |

OTHER PUBLICATIONS

German Search Report, Application No. 102007026824.8-14 dated Jun. 6, 2007.

* cited by examiner

METHOD FOR MANUFACTURING CAMS FOR COMPOSITE CAMSHAFTS

The invention pertains to a method for manufacturing cams for composite camshafts and to a method for manufacturing composite camshafts with thusly manufactured cams.

BACKGROUND OF THE INVENTION

Among other things, hot-formed cams are already used for assembling composite camshafts. Depending on the joining or assembly principle, according to which the cams are fixed on a shaft or a shaft tube, as well as the component and assembly tolerances to be observed, these hot-formed cams are nowadays subjected to subsequent mechanical processing, i.e., machining, in the cam bore and, in part, on the plane surfaces of the cam. This processing is required in order to limit the position errors between the cam bore and the cam outside contour created during hot-forming because this error manifests itself in the form of an oversize on the contour of the cam after the assembly and needs to be subsequently removed by grinding. The end faces (plane surfaces) are processed in order to reduce axial run-outs, i.e., angle errors of the end faces referred to the bore axis, such that the entire width of the cam is used as a running surface. The end faces (plane surfaces) are also processed in order to prepare flange geometries if the cam is realized in the form of a collared or flanged cam with an adjacent collar or flange.

The end measures of the cam bore required for thermally joining or axially pressing the cam to/on a tube are nowadays achieved by means of precision turning (e.g., hard turning) or internal grinding of the cam bore. In addition, insertion chamfes required for mechanically joining the cams with an axially knurled shaft or for pushing the cams on raised cam seats on a shaft are also turned or ground on the cam bores. Cams that are joined to a shaft tube by means of internal high-pressure forming of the shaft tube were line-bored until now in order to achieve a more precise position of the bore relative to the cam outside contour and to realize the joining gap with close tolerances.

The disadvantages of the preparatory machining of the cams can be seen in the cost-intensive material removal process, in which it is difficult to machine the cam in a defined fashion over its cam outside contour, as well as the expenditures for the technical measurements required for checking the result of the mechanical processing.

BRIEF SUMMARY OF THE INVENTION

Based on these circumstances, the present invention aims to develop a method for manufacturing hot-formed cams that makes it possible to reduce the number of machining steps. This objective is attained with a method for manufacturing cams for composite camshafts with the following steps
  hot-forming a cam such that a cam outside contour is formed and a cam bore is punched and
  axially and radially calibrating the cam,
wherein the calibration comprises the steps
  inserting the cam into an undivided mould that defines the calibrated cam outside contour,
  inserting an arbor into the cam bore that defines the calibrated cam bore, and
  axially shortening the cam between a lower die that is situated between the mould and the arbor and on which the cam lies with a first end face and an upper die that is guided between the mould and the arbor and acts upon the second end face of the cam.

The calibration can be carried out in the state of the residual heat from the hot-forming process or on a cam that has been cooled off to the ambient temperature.

In the described method, the cam is preferably in the semi-hot or cold state when it is calibrated to end measures that eliminate the need for subsequent mechanical processing of the cam bore and the end faces for joining methods, in which the shaft tube is subjected to internal high-pressure forming or the cam is thermally shrunk on the cam or the cam is joined to an axially knurled shaft or the cam is pushed on raised regions on a shaft. In the aforementioned calibration process, it is merely required to provide a grinding allowance on the cam contour for grinding the camshaft after the joining process. Although the tool dimensions are decisive for the dimensional accuracy of the cam outside contour and the cam bore, the axial travel of the dies relative to one another is decisive for the final cam width.

It is particularly advantageous that the surfaces of the cam contour and the cam bore that necessarily have a slightly conical shape after the forging process are provided with an improved cylindrical shape that may be completely straight or crowned in order to make it possible, in particular, to realize the joining without any subsequent processing of the cam bore. In addition, any axial run-out of the end faces (plane surfaces) is compensated such that the entire cam width can be used as running surface and the width of the cam can be realized with close tolerances.

It is furthermore possible to completely compensate position errors between the bore axis and the contour during the course of the calibration process, wherein such position errors could only be compensated until now with significant machining allowances and correspondingly large volumes of material to be removed. The calibrating almost completely compensates the variations after the hot-forming process which are unavoidable due to the significant tool wear during hot-forming.

In addition to the mechanical processing steps (machining steps), the usually required annealing step that is a general prerequisite for mechanical processing after hot-forming can also be eliminated.

The hot-forming of the cam may comprise the following steps:
  separating a slab from bar stock,
  forming the slab into a slab with a cam outside contour, and
  punching the slab by means of a punch in order to produce the cam bore.

The bar stock may consist of a round bar or a profiled bar, wherein the cross section of the latter may already have the approximate shape of the cam.

According to a first embodiment, the punching is carried out with a punch with a round cutting edge that produces a smooth cam bore. This results in the preparation of a cam that has a cylindrical fitting surface for being mounted on a shaft after the calibration such that the fitting surface for being mounted on a shaft is maximized.

A cam with a cam bore of this type is particularly suitable for being fixed on a hollow shaft by means of internal high-pressure forming.

According to a second embodiment, the punching is carried out with a punch with a profiled cutting edge that, in particular, is circumferentially corrugated or circumferentially serrated.

The thusly produced profile of the cam bore provides free spaces for the ensuing step, into which material can yield during the calibration process. Consequently, this makes it possible to correct the geometry of a forged cam in all of its directions.

Due to the profiling, the contact surface between the round arbor of the calibrating die and the cam bore is reduced to the region of the peaks of the profile. This means that the contact forces being generated between the arbor and the cam bore during the calibration initially act upon the smaller surface of the profile peaks only. The transverse forces to be absorbed by the arbor are effectively reduced such that yielding or shearing of the arbor is prevented.

During the calibration, the profile peaks that lie outside the nominal position initially come in contact with the round arbor. Consequently, the entire counterforce of the arbor is effective in this case. The profile is plastically deformed at these locations during the calibration. This results in a cam bore with such flattened profile peaks that the inner circle being produced is corrected to the nominal position of the cam bore. Machining allowances therefore are effectively reduced because the cam outside contour and the position of the cam bore relative to the cam outside contour are simultaneously corrected during the calibration.

The depth of the profile and the inner circle of the unprocessed profile after the punching are chosen such that the arbor can be inserted into the not yet calibrated cam when it is situated in the ideal position and the deformed profile peaks circumferentially adjoin the round arbor after the calibration process.

In summation, the diameter of the maximum inscribed circle needs to at least correspond to the sum of the arbor diameter and the eccentricity of the bore. In addition, the profile depth should at least correspond to the eccentricity in order to realize a surface contact as late as possible during the calibration process.

In summation, the inner circle of the unprocessed profile after the punching needs to at least correspond to the sum of the arbor diameter and the eccentricity of the unprocessed cam bore. In addition, the profile depth should at least correspond to the eccentricity in order to realize a surface contact as late as possible during the calibration process.

The geometrically corrected cam is hardened and tempered and subsequently joined to a camshaft. In this case, the inner profiling of the cam bore is realized such that a tubular shaft deformed by applying high pressure to its interior in order to join the cams ideally is able to completely follow the profile of the calibrated cam bore such that it is in surface contact with the cam bore and radially tensioned relative thereto due to the plastic deformation of the tube. However, light gaps may also remain between the peaks of the profiled cam bore that adjoin the tubular shaft after the joining process.

The hot-forming is carried out after heating the material to a temperature above 1100° C. In this context, it is proposed, in particular, that the separation of the individual slabs by means of shearing is not carried out until the material has been heated, i.e., in the hot state. Although the hot-forming comprises several steps, particularly three steps, the calibration is carried out in a single stroke of the upper die relative to the lower die.

Standard cams are manufactured by using plane one-piece upper and lower dies that are open toward the cam. In order to manufacture cams with one flange neck or two flange necks, it is proposed that at least the upper die and, if applicable, the lower die consist of two parts, namely of an outer contour die and an inner flange die that has the shape of a cylindrical ring and is axially set back. The contour die and the flange die may be adjustable independently of one another in this case. This makes it possible to form a flange neck of largely finished shape on one or both end faces of the cam.

As indicated above, special characteristics of the method consist of calibrating the cam bore to the finished size for immediate joining and of calibrating the cam contour with a grinding allowance only.

A method for manufacturing a composite camshaft with cams manufactured in the above-described fashion may include the steps of threading cams on a shaft tube in the cold state and subsequently subjecting the shaft tube to an internal high-pressure deformation within the cams, as well as a process in which the cams are heated before they are pushed on a shaft and thermally shrunk thereon by cooling off the cams and a process in which the cams are sequentially pushed on shaft regions that are oversized referred to the cam bore.

Preferred examples of inventive cams and an inventive method for their manufacture are illustrated in the figures and described below.

BRIEF DESCRIPTION OF THE DRAWINGS

FIG. 1 shows a first embodiment of a cam manufactured in accordance with the invention in the form of
a) an axial view of the cam bore and
b) the section A-A in illustration a);
FIG. 3 shows an axial section through a cam and the mould and the arbor of a calibrating die
a) prior to the calibration and
b) subsequent to the calibration;
FIG. 4 shows a second embodiment of a cam manufactured in accordance with the invention in the form of
a) an axial view of the cam bore and
b) the section B-B in illustration a), namely prior to the calibration (continuous lines) and subsequent to the calibration (broken line), respectively,
and
FIG. 5 shows the cam according to FIG. 4 with the arbor of a calibrating die in the form of
a) an axial view of the cam bore and
b) the section B-B in illustration a), namely prior to the calibration (continuous lines) and subsequent to the calibration (broken line), respectively.

DETAILED DESCRIPTION OF THE INVENTION

Figure 1:
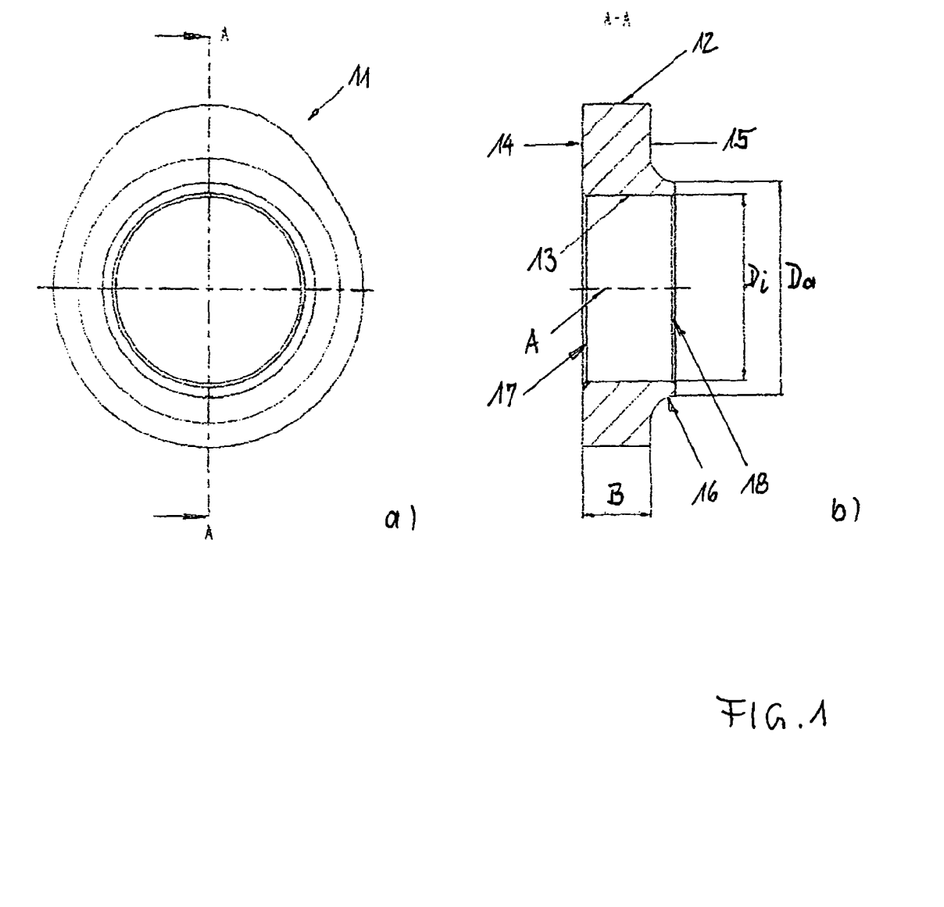

The two illustrations in FIG. 1 are described jointly below. The cam 11 is illustrated in the special form of a flanged cam and has the following characteristics: a cam outside contour 12 or cam surface with axially parallel surface areas, i.e., an absolutely cylindrical shape, on the contour base, as well as a cam bore 13, a first plane end face 14 and a second plane end face 15, from which an annular flange 16 rises with a rounded transition. The end faces 14, 15 lie exactly parallel to one another and axially normal to the longitudinal axis A of the cam bore 13. Facets 17, 18 illustrated in the cam bore 13 were already produced during the hot-forming process. The inside dimension of the cam bore is identified by the reference symbol Di, the outside dimension of the flange on the axial end is identified by the reference symbol Dα and the width of the cam track is identified by the reference symbol B.

Figure 2:
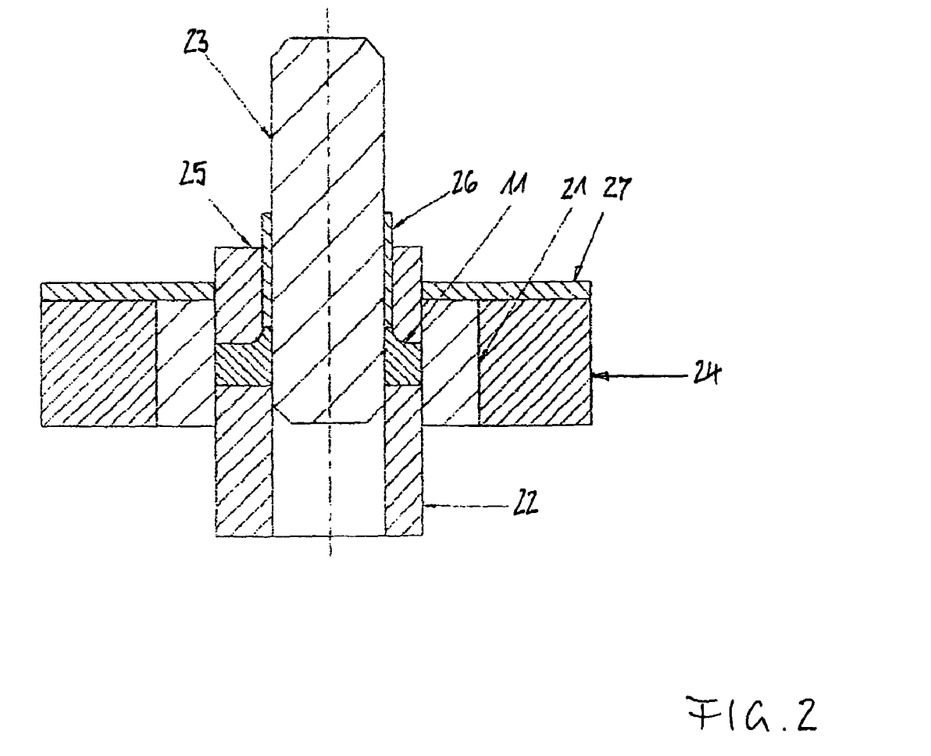
FIG. 2 shows an axial section through the axis of the cam bore and the axis of a calibrating die at the end of the calibration process.

In FIG. 2, the cam 11 shown is inserted into a mould 21, wherein the cam lies on a lower die 22 that engages into the mould 21 without clearance. An arbor 23, the position of which relative to a mould receptacle 24 is exactly defined, is inserted into the cam bore 13, wherein the arbor is connected to the mould receptacle 24, particularly in a rigid fashion. A divided upper die consisting of an outer contour die 25 and an inner flange die 26 lies on the upper end face and the flange. The two upper dies jointly engage between the arbor and the mould without clearance. This figure also shows a cover 27 that covers the top of the mould 21. The situation shown represents the state at the end of the calibration process, in which the cam is enclosed between the mould, the upper die, the lower die and the arbor without any clearance.

Figure 3:
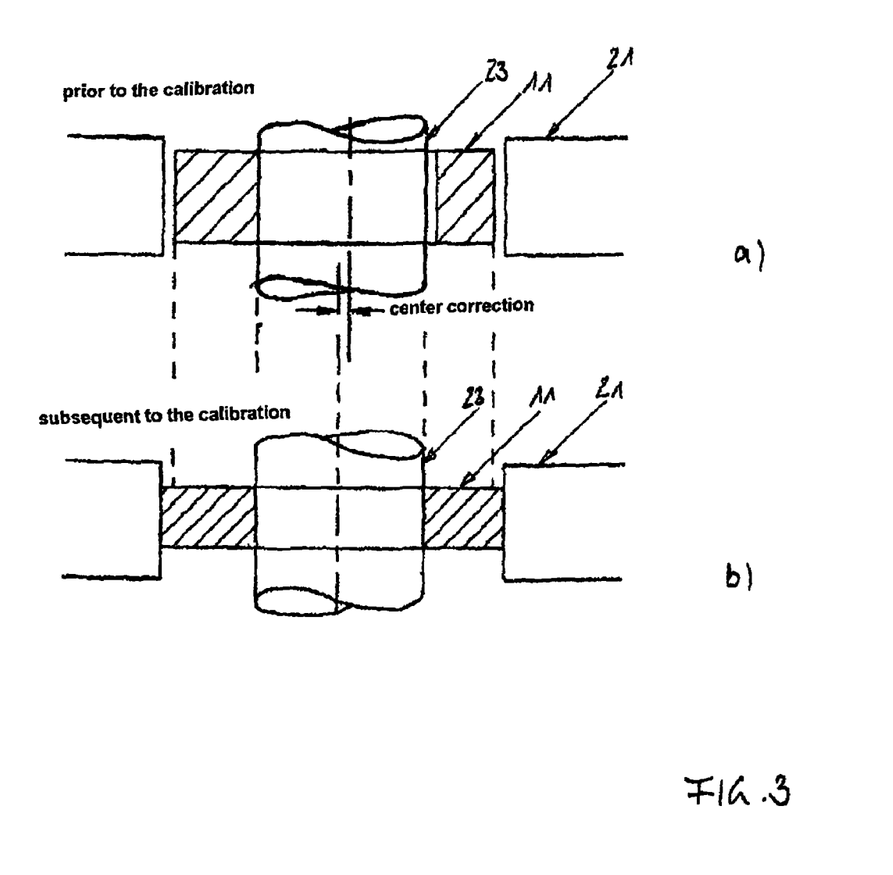

FIG. 3 shows the position of a cam 11 relative to a mould 21 and the arbor 23 of a calibrating die, namely prior to the calibration in illustration a) and subsequent to the calibration in illustration b).

This figure shows that the cam contour in illustration a) still has a certain clearance relative to the mould 21, namely analogous to the clearance of the arbor 23 relative to the cam bore 13. In addition, this figure shows a position error of the cam bore relative to the arbor. It would also be possible that either the mould 21 or the arbor 27 already captures the cam contour and the cam bore without clearance on at least one point of the circumference and a certain radial clearance over the entire circumference only exists between the respectively other tool part and the cam. Illustration b) shows the state after the completion of the calibration process. The width of the cam is significantly reduced. Consequently, the cam contour now has no clearance relative to the mould and the cam bore has no clearance relative to the arbor. This means that the center of the cam bore was corrected, wherein the conical flaws of the cam contour and the cam bore are also no longer present.

Figure 4:
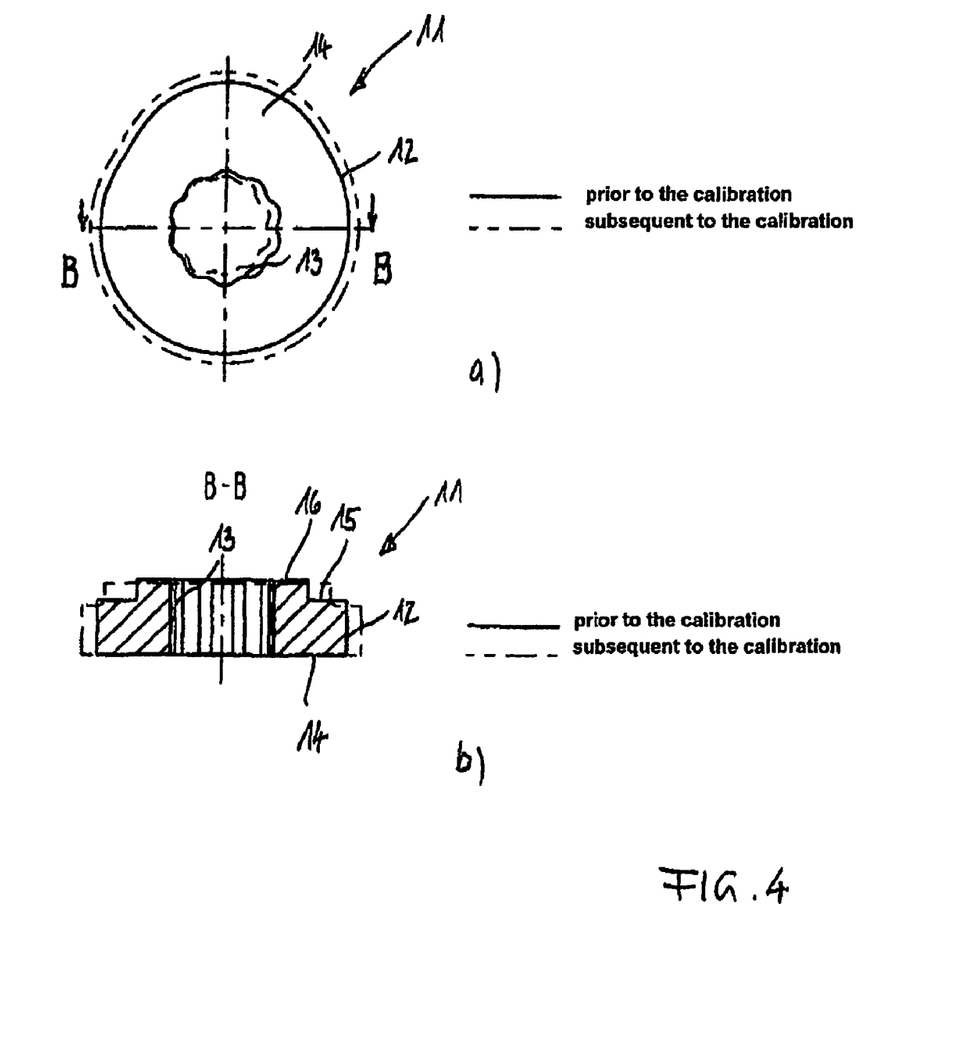

The two illustrations in FIG. 4 are described jointly below. The cam 11 in the form of a flanged cam is illustrated with continuous lines prior to the calibration and with broken lines subsequent to the calibration. The reference lines of the reference symbols are respectively positioned on the continuous lines prior to the calibration. The cam has a cam outside contour 12, the circumference of which is larger subsequent to the calibration than prior to the calibration. The cam furthermore has a first end face 14 and a second end face 15, over which an annular flange 16 protrudes. The distance between the end faces 14, 15 and the height of the annular flange 16 relative to the end face 15 are larger prior to the calibration than subsequent to the calibration. This figure furthermore shows a profiled cam bore 13 on the cam that has a corrugated profile over the circumference. The cam bore 13 is not positioned correctly relative to the cam outside contour 12 prior to the calibration and positioned correctly relative to the cam outside contour 12 subsequent to the calibration.

Figure 5:
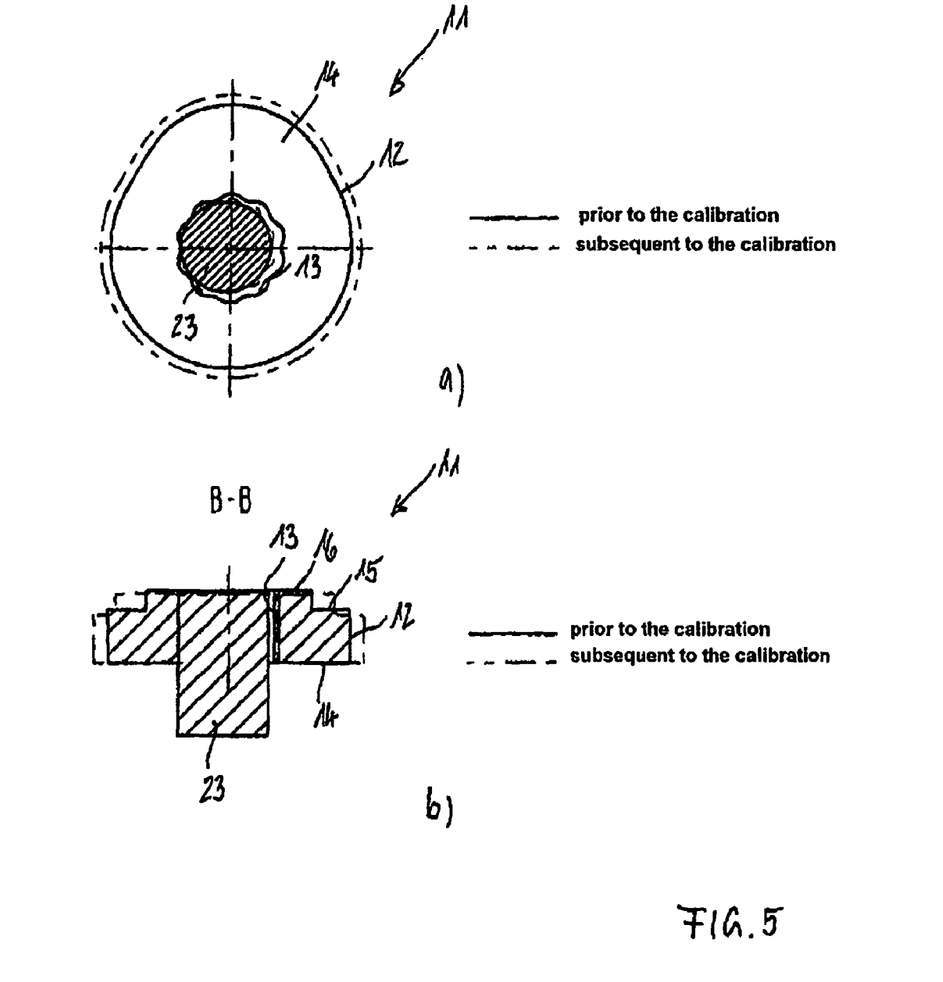

The two illustrations in FIG. 5 are described jointly below. Identical details are identified by the same reference symbols as in FIG. 4. The contour of the cam is also drawn with continuous lines prior to the calibration and with broken lines subsequent to the calibration in this case. The reference lines of the reference symbols are respectively positioned on the continuous lines prior to the calibration. In addition to the cam 11, this figure also shows the arbor 23, wherein the circumferentially corrugated, profiled cam bore 13 is not positioned correctly relative to said arbor prior to the calibration and ideally positioned concentric to the arbor 23 subsequent to the calibration. In this case, the arbor is positioned correctly relative to the cam outside contour 12 subsequent to the calibration due to the correctly positioned arrangement of the not-shown mould relative to the arbor.

The invention claimed is:

1. A method for manufacturing cams for composite camshafts comprising the steps of:
hot-forming a cam such that a cam outside contour is produced and a cam bore is punched, and
axially and radially calibrating the cam, wherein the calibration comprises the steps of:
inserting the cam into an undivided mould;
inserting an arbor into the cam bore; and
axially shortening the cam between a lower die that is situated between the mould and the arbor and on which the cam lies with a first end face and an upper die that is guided between the mould and the arbor and acts upon the second end face of the cam;
wherein the axial shortening of the cam results in a calibration of both the cam outside contour and the cam bore such that a correction of the cam before and the cam outside contour relative to one another is produced;
wherein said undivided mould defines the calibrated cam outside contour; and
wherein said arbor defines the calibrated cam bore.

2. The method according to claim 1, characterized in that the hot-forming of the cam comprises the steps separating a slab from bar stock, forming the slab into a slab with a cam outside contour, and punching the slab by means of a punch in order to produce the cam bore.

3. The method according to claim 1, characterized in that the punching of the cam bore is carried out with a round punch that produces a smooth bore.

4. The method according to claim 1, characterized in that the punching of the cam bore is carried out with a profiled punch that produces a profiled bore, particularly a bore that is corrugated or serrated over the circumference.

5. The method according to claim 1, characterized in that the hot-forming is carried out after heating the material to a temperature above 1100° C.

6. The method according to claim 2, characterized in that the separation of the slab from bar stock is realized by means of shearing.

7. The method according to claim 6, characterized in that the shearing is carried out after heating the material in bar form.

8. The method according to claim 1, characterized in that the calibration is carried out in a residual heat from the hot-forming process.

9. The method according to claim 1, characterized in that the calibration is carried out after cooling the cam to the ambient temperature.

10. A method for manufacturing a composite camshaft with a cam manufactured in accordance with claim 1, characterized in that the cams are threaded on a shaft tube in the intended position and the shaft tube is respectively widened within the cams by means of internal high-pressure forming.

11. A method for manufacturing a composite camshaft with a cam manufactured in accordance with claim 1, characterized in that the cams are heated before being threaded on a shaft in the intended position and thermally shrunk on the shaft by cooling off the cams.

12. A method for manufacturing a composite camshaft with a cam manufactured in accordance with claim 1, characterized in that the cams are successively pushed on shaft regions of a shaft that are oversized with reference to the cam bore.

13. A method for manufacturing cams for composite camshafts comprising the steps of:
hot-forming a cam such that a cam outside contour is produced and a cam bore is punched, and
axially and radially calibrating the cam such that position errors between the cam bore and the cam outside contour are compensated, wherein the calibration comprises the steps of:

inserting the cam into an undivided mould;
inserting an arbor into the cam bore; and
axially shortening the cam between a lower die that is situated between the mould and the arbor and on which the cam lies with a first end face and an upper die that is guided between the mould and the arbor and acts upon the second end face of the cam;
wherein said axial shortening of the cam results in a calibration of both the cam outside contour and the cam bore such that a correction of the cam bore and the cam outside contour relative to one another is produced;
wherein said undivided mould defines the calibrated cam outside contour; and
wherein said arbor defines the calibrated cam bore.

14. A method for manufacturing cams for composite camshafts comprising the steps of:
hot-forming a cam such that a cam outside contour is produced and a cam bore is punched, and
axially and radially calibrating the cam, wherein the calibration comprises the steps of:
inserting the cam into an undivided mould;
inserting an arbor into the cam bore, wherein the arbor is arranged and positioned radially play-free relative to the mould; and
axially shortening the cam between a lower die that is situated between the mould and the arbor and on which the cam lies with a first end face and an upper die that is guided between the mould and the arbor and acts upon the second end face of the cam;
wherein said axial shortening of the cam results in a calibration of both the cam outside contour and the cam bore such that a correction of the cam bore and the cam outside contour relative to one another is produced;
wherein said undivided mould defines the calibrated cam outside contour; and
wherein said arbor defines the calibrated cam bore.

* * * * *

UNITED STATES PATENT AND TRADEMARK OFFICE
CERTIFICATE OF CORRECTION

PATENT NO. : 8,375,580 B2
APPLICATION NO. : 12/156801
DATED : February 19, 2013
INVENTOR(S) : Rudolf Bonse, Jurgen Schellbach and Jochen Wolf Page 1 of 1

It is certified that error appears in the above-identified patent and that said Letters Patent is hereby corrected as shown below:

Column 6, Claim 1, Line 10, after wherein, change "the" to --said--.

Column 6, Claim 1, Line 12, after cam, change "before" to --bore--.

Signed and Sealed this
Ninth Day of April, 2013

Teresa Stanek Rea
*Acting Director of the United States Patent and Trademark Office*